United States Patent
Park et al.

(10) Patent No.: US 10,930,936 B2
(45) Date of Patent: Feb. 23, 2021

(54) APPARATUS AND METHOD FOR MANUFACTURING CONTINUOUS REACTOR TYPE CORE-SHELL CATALYST ELECTRODE

(71) Applicant: KOREA INSTITUTE OF ENERGY RESEARCH, Daejeon (KR)

(72) Inventors: Gu-gon Park, Daejeon (KR); Hyo-june Lee, Sejong-si (KR); Chang-soo Kim, Incheon (KR); Won-yong Lee, Daejeon (KR); Tae-hyun Yang, Daejeon (KR); Sung-dae Yim, Daejeon (KR); Min-jin Kim, Daejeon (KR); Young-jun Sohn, Daejeon (KR); Byung-chan Bae, Daejeon (KR); Seung-gon Kim, Daejeon (KR); Dong-won Shin, Sejong-si (KR); Hwan-yeong Oh, Daejeon (KR); Seung-hee Woo, Daejeon (KR); So-jeong Lee, Daejeon (KR); Hye-jin Lee, Daejeon (KR); Yoon-young Choi, Sejong-si (KR); Seok-hee Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 16/439,481

(22) Filed: Jun. 12, 2019

(65) Prior Publication Data
US 2020/0168914 A1    May 28, 2020

(30) Foreign Application Priority Data
Nov. 27, 2018    (KR) .................. 10-2018-0148731

(51) Int. Cl.
*C23C 18/54*    (2006.01)
*H01M 4/88*    (2006.01)
(Continued)

(52) U.S. Cl.
CPC .......... *H01M 4/8853* (2013.01); *C23C 18/54* (2013.01); *H01M 4/8657* (2013.01); *H01M 4/925* (2013.01)

(58) Field of Classification Search
CPC ....... C25D 3/38–40; C23C 18/54; H01M 4/92
See application file for complete search history.

(56) References Cited

U.S. PATENT DOCUMENTS

| | | | |
|---|---|---|---|
| 2016/0083861 A1* | 3/2016 | Savidand ................ | C25D 5/50 205/143 |
| 2018/0034062 A1* | 2/2018 | Matsutani .............. | B01J 37/348 |

* cited by examiner

*Primary Examiner* — Brian W Cohen
*Assistant Examiner* — Ho-Sung Chung
(74) *Attorney, Agent, or Firm* — Birch, Stewart, Kolasch & Birch, LLP

(57) ABSTRACT

An apparatus and a method for manufacturing a continuous reactor type core-shell catalyst electrode, which may manufacture a large amount of continuous reactor type core-shell catalyst electrodes by improving coating efficiency of shell metal by using reaction chambers disposed in a circular shape or in a line are provided. The apparatus for manufacturing a continuous reactor type core-shell catalyst electrode includes: a main body; reaction chambers which are disposed plurally in a circular shape inside the main body, store reaction solution inside thereof, are equipped with a movable member and counter electrodes, and are coupled with a reference electrode to a lateral portion thereof; a palladium sheet which is moved by the movable member and immersed in the reaction solution as the movable member moves downward; a power supply which applies a voltage to the electrodes.

4 Claims, 4 Drawing Sheets

(51) Int. Cl.
*H01M 4/92* (2006.01)
*H01M 4/86* (2006.01)

[FIG. 1]
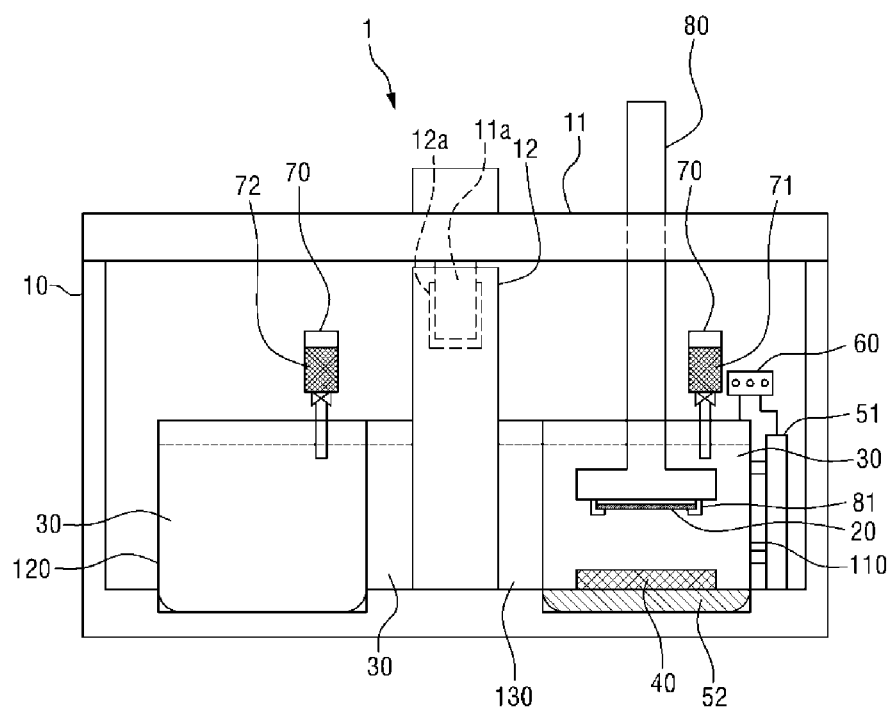

[FIG. 2]
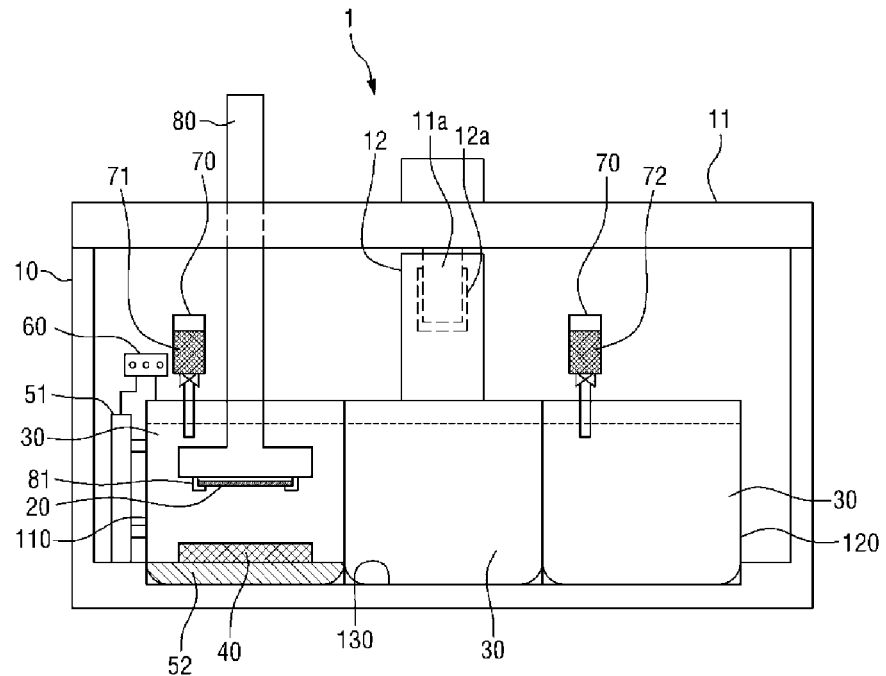
[FIG. 3]
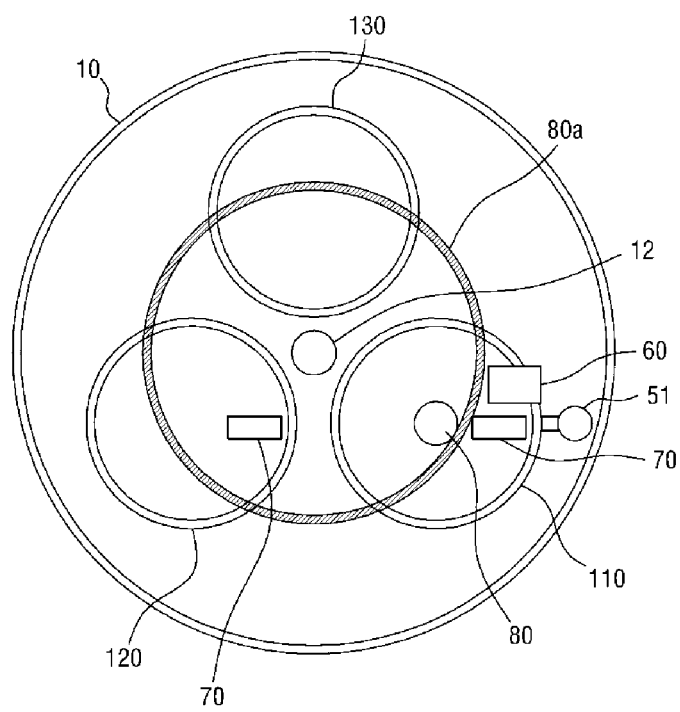

[FIG. 4]
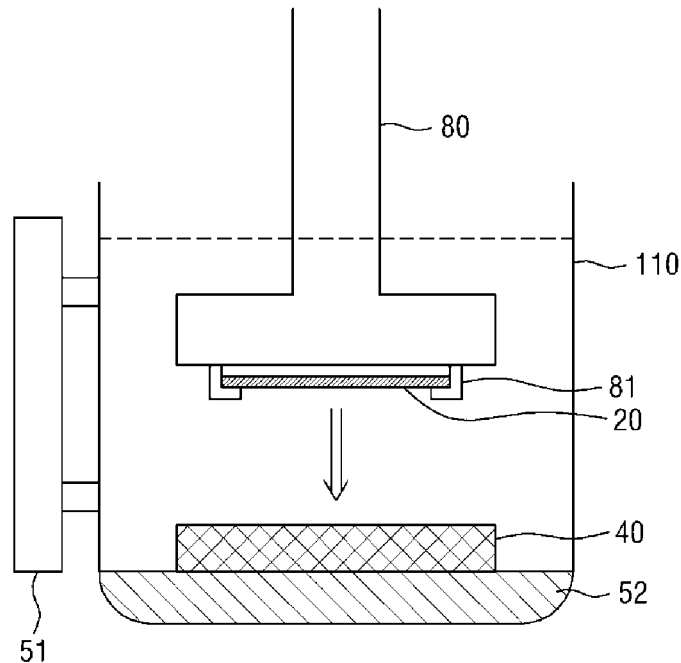
[FIG. 5]
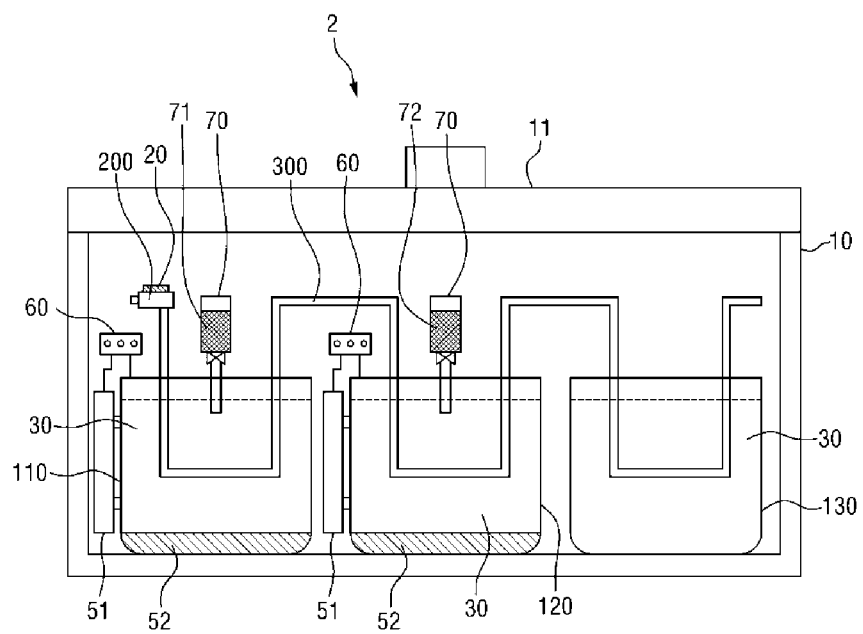

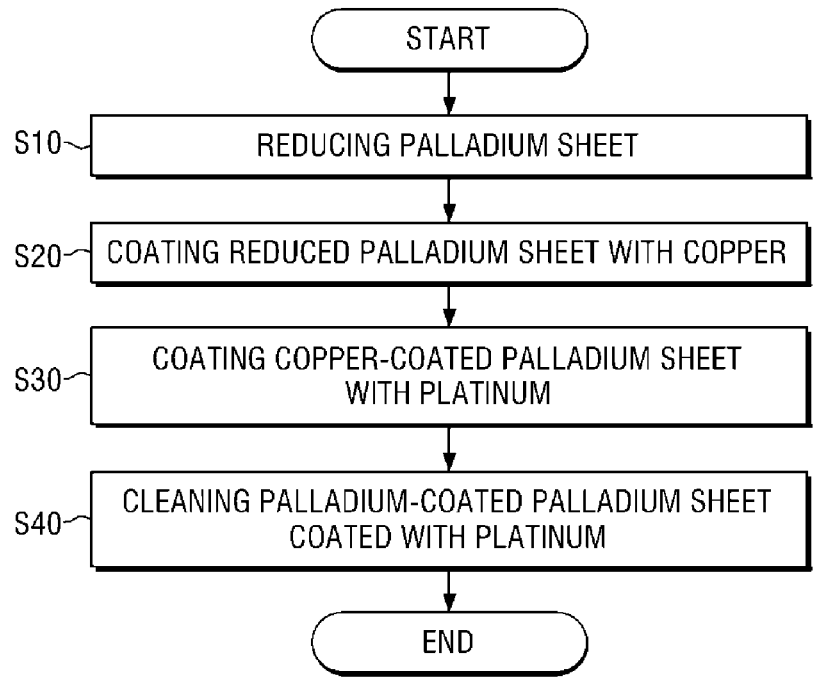

APPARATUS AND METHOD FOR MANUFACTURING CONTINUOUS REACTOR TYPE CORE-SHELL CATALYST ELECTRODE

CROSS-REFERENCE TO RELATED APPLICATIONS

This application claims the priority of Korean Patent Application No. 2018-0148731 filed on Nov. 27, 2018, in the Korean Intellectual Property Office, the disclosure of which is incorporated herein by reference.

BACKGROUND

Field

The present disclosure relates to an apparatus and a method for manufacturing a continuous reactor type core-shell catalyst electrode, which may manufacture a large amount of continuous reactor type core-shell catalyst electrodes by improving coating efficiency of shell metal by using reaction chambers disposed in a circular shape or in a line.

Description of the Related Art

A hydrogen fuel cell is an environmentally-friendly energy source that does not release pollutants, and thus many researches are being conducted on the hydrogen fuel cell in the academic and industrial fields in the present situation where global interests and researches on next-generation energy sources are increased due to depletion of fossil fuel resources. In particular, a hydrogen fuel cell for a vehicle is expected to be substituted for a petroleum-based engine in the related art, and the industry related to the hydrogen fuel cell will become an industry having high market potential with enormous influence in the future.

A polymer electrolyte fuel cell (proton exchange membrane fuel cell (PEMFC)) refers to a system that generates power by performing a direct electrochemical reaction on hydrogen. The polymer electrolyte fuel cell may be an environmentally-friendly energy source because no pollutant is produced while water is obtained as hydrogen is oxidized at a negative electrode and oxygen is reduced at a positive electrode. An operating temperature of the hydrogen fuel cell is about 50 to 100° C. which is a comparatively low temperature, and the hydrogen fuel cell has high energy density. For this reason, the hydrogen fuel cell may be used for a small-sized energy source for home use as well as an engine for a vehicle. However, the hydrogen fuel cell has a problem to be solved in that output energy density is low due to a low reaction speed, a large amount of platinum catalysts is used, and moisture produced on a surface of an electrode needs to be removed.

Recently, many researches are being conducted to solve the problems in order to make the hydrogen fuel cell commercially available. In particular, researches for improving power conversion efficiency through improvement of a hydrogen fuel cell catalyst are considered very important. A platinum catalyst has been known to exhibit the highest activity among metal catalysts used for oxygen reduction for the hydrogen fuel cell catalyst. However, the price of platinum has been increased in recent years due to an increasing demand for platinum. Because the price of platinum is increased, synthesization of a catalyst, which is higher in electrical activity than pure platinum, is required together with a small usage amount of platinum. To meet this requirement, at present, researches are actively conducted on synthesization of a catalyst having a core-shell structure.

Korean Patent Application Laid-Open No. 2009-0045412, which is a related art associated with the synthesization of the catalyst having the core-shell structure, discloses an electrode catalyst as a catalyst particle including an M core/M shell structure in which an inner particle core is palladium, an outer particle shell is platinum, and the catalyst particle is supported on a support (carbon black, graphite), but there is a problem in that the activity of the catalyst somewhat deteriorates because a colloidal dispersion liquid is not removed.

Further, Korean Patent Application Laid-Open No. 2006-0082595 discloses a method of manufacturing an electrode catalyst for a fuel cell, in which the electrode catalyst includes a metal compound particle made of palladium, and an active particle having a core-shell structure including a platinum or platinum-containing alloy coating layer formed on an overall surface of the particle, and the method includes manufacturing a precursor solution by dissolving a precursor compound including palladium, and drying the metal compound particle in a state in which the metal compound particle is immersed in a catalyst carrier. However, there is a problem in that sizes of the catalyst particles are not uniform.

According to the previously reported papers, the palladium-platinum core-shell nanoparticle catalyst synthesized by using an underpotential deposition (UPD) method exhibits activity per unit mass which is higher by about five times because of a weak interaction between platinum, which exists on a surface due to an influence of palladium which is a core material, and an intermediate produced due to reduction of oxygen (RR Adzic, et al., J Am Chem Soc 2009, 131, 17298). Further, the palladium-platinum core-shell nano-catalyst synthesized in this manner also has high durability as a catalyst because the core material improves stability of platinum that constitutes a shell (RR Adzic, et al., Angew Chem Int Ed 2010, 49, 8602).

Furthermore, the paper in the related art discloses that the method includes depositing, on a precious metal core particle, a thin layer of metal atom which has lower reduction potential than platinum. Further, some manufacturers use an underpotential deposition process in order to deposit a copper atom as a metal having a lower reduction potential, and then the core particle is mixed with a solution containing platinum salt. In this case, the platinum atom in the solution is autonomously substituted with the copper atom on the precious metal core in order to form a thin layer of platinum atom on the precious metal core.

Meanwhile, according to the method of synthesizing a catalyst having a core-shell structure according to the papers in the related art, the catalyst is synthesized on a carbon electrode which is a working electrode. However, there are problems in that mass-production is not easily implemented by this method, it is difficult to synthesize the nanoparticles having a uniform size, and efficiency in coating the precious metal core with the platinum atom greatly deteriorates.

SUMMARY

The present disclosure has been made in an effort to solve the above-mentioned problems, and an object of the present disclosure is to provide an apparatus and a method for manufacturing a continuous reactor type core-shell catalyst electrode, which may coat a palladium sheet by using reaction chambers disposed in a circular shape or in a line, thereby improving coating efficiency of shell metal.

Further, another object of the present disclosure is to provide an apparatus and a method for manufacturing a continuous reactor type core-shell catalyst electrode, which may manufacture a large amount of core-shell catalyst electrodes by moving a palladium sheet and coating a particle surface of core metal with shell metal in reaction chambers.

Meanwhile, technical problems to be solved by the present disclosure are not limited to the above-mentioned technical problems, and other technical problems, which are not mentioned above, may be clearly understood from the following descriptions by those skilled in the art to which the present disclosure pertains.

As a technical means for achieving the above-mentioned objects, an apparatus for manufacturing a continuous reactor type core-shell catalyst electrode according to one exemplary embodiment of the present disclosure includes: a main body which is provided with a support inside thereof and an upper portion of which is opened and closed by being detached from or attached to the support; reaction chambers which are disposed plurally in a circular shape inside the main body, store reaction solution inside thereof, are equipped with a movable member and counter electrodes, and a lateral portion of which is coupled with a reference electrode; a power transmission member which transmits power to the movable member; a palladium sheet which is moved by the movable member and immersed in the reaction solution as the movable member moves downward; a power supply which applies a voltage to the electrodes; and a solution injection member which injects a copper precursor-containing solution or a platinum precursor-containing solution into the reaction solution.

In one exemplary embodiment, the reaction chamber may include: a first reaction chamber in which the counter electrode is installed inside thereof, the reference electrode is coupled to the lateral portion thereof, the palladium sheet, which is moved by the movable member and immersed in the reaction solution, is reduced, and then the reduced palladium sheet is coated with copper; and a second reaction chamber in which the copper-coated palladium sheet, which is moved from the first reaction chamber by the movable member and then immersed in the reaction solution, is coated with platinum.

In one exemplary embodiment, the first reaction chamber is characterized in that the power supply provides electric potential which is higher than power for copper oxidation, for the electrode which is installed inside the first reaction chamber and coupled thereto, allowing coating the reduced palladium sheet.

In one exemplary embodiment, the first reaction chamber accommodates a porous block which is composed of a metal mesh to be contacted with the palladium sheet which is moved downwardly by the movable member.

In one exemplary embodiment, in the second reaction chamber, the palladium sheet coated with copper may be immersed in the reaction solution, and the palladium sheet, which is coated with copper, may be coated with platinum as the platinum precursor-containing solution is injected into the reaction solution from the solution injection member.

As a technical means for achieving the above-mentioned objects, an apparatus for manufacturing a continuous reactor type core-shell catalyst electrode includes: a main body an upper portion of which is opened and closed by attachment/detachment; reaction chambers which are disposed plurally in a line inside thereof, store reaction solution inside thereof, are equipped with counter electrodes, and a lateral portion of which is coupled with a reference electrode; a palladium sheet which is immersed in the reaction solution; a movable member which accommodates the palladium sheet and moves the accommodated palladium sheet to be immersed in the reaction solution; a moving path member which provides the movable member with a moving path; a power transmission member which transmits power to the movable member; a power supply which applies a voltage to the electrodes; and a solution injection member which injects a copper precursor-containing solution or a platinum precursor-containing solution into the reaction solution.

In another exemplary embodiment, the reaction chamber may include: a first reaction chamber in which the counter electrode is installed inside thereof, the reference electrode is coupled to the lateral portion thereof, the palladium sheet, which is moved by the movable member and immersed in the reaction solution, is reduced, and then the reduced palladium sheet is coated with copper; and a second reaction chamber in which the copper-coated palladium sheet, which is moved from the first reaction chamber by the movable member and then immersed in the reaction solution, is coated with platinum.

In another exemplary embodiment, the first reaction chamber is characterized in that the power supply provides electric potential which is higher than power for copper oxidation, for the electrode which is installed inside the first reaction chamber and coupled thereto, allowing coating the reduced palladium sheet.

In another exemplary embodiment, the second reaction chamber is characterized in that the copper-coated palladium sheet is immersed in the reaction solution and the platinum precursor-containing solution is injected into the reaction solution from the solution injection member, allowing coating the copper-coated palladium sheet with platinum.

As a technical method of achieving the above-mentioned objects, a method of manufacturing a continuous reactor type core-shell catalyst electrode by using reaction chambers disposed in a circular shape includes: a first step of reducing a palladium sheet by applying a voltage to an electrode immersed in a reaction solution when the palladium sheet is moved by a movable member and immersed in the reaction solution of the reaction chamber; a second step of coating the reduced palladium sheet with copper by injecting a copper precursor-containing solution into the reaction solution and then providing electric potential, which is higher than oxidation and reduction of copper, for the electrode; and a third step of coating the copper-coated palladium sheet with platinum by injecting a platinum precursor-containing solution into reaction solution when the copper-coated palladium sheet is moved by the movable member and immersed in the reaction solution of a reaction chamber different from the reaction chambers at the first and second steps.

According to the exemplary embodiment of the present disclosure, a method of manufacturing a continuous reactor type core-shell catalyst electrode by using reaction chambers disposed in a line comprises: a first step of reducing a palladium sheet by applying a voltage to an electrode immersed in a reaction solution when the palladium sheet accommodated on a movable member is moved along a moving path and immersed in the reaction solution in the reaction chamber; a second step of coating the reduced palladium sheet with copper by injecting a copper precursor-containing solution into the reaction solution and then providing electric potential, which is higher than oxidation and reduction of copper, for the electrode; and a third step of coating the copper-coated palladium sheet with platinum by injecting a platinum precursor-containing solution into reaction solution when the copper-coated palladium sheet is moved by the movable member and immersed in the reaction solution of a reaction chamber different from the reaction chambers at the first and second steps.

According to the exemplary embodiment of the present disclosure, as the palladium sheet extends, an area capable of controlling electric potential on the reaction chambers disposed in a circular shape is increased, allowing improving coating efficiency of the palladium sheet with a shell.

Further, according to another exemplary embodiment of the present disclosure, the movable member moves the palladium sheet while repeatedly moving, stopping, and moving again, allowing efficiently manufacturing a core-shell catalyst electrode.

According to the aforementioned exemplary embodiments of the present disclosure, it may improve coating efficiency of the palladium sheet with the shell metal in the reaction chambers, and may efficiently manufacture a core-shell catalyst electrode, allowing manufacturing a large amount of core-shell catalyst electrodes.

Meanwhile, the effects obtained by the present disclosure are not limited to the aforementioned effects, and other effects, which are not mentioned above, will be clearly understood by those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a cross-sectional view schematically illustrating a configuration of an apparatus for manufacturing a continuous reactor type core-shell catalyst electrode according to one exemplary embodiment of the present disclosure when viewed from the front side.

FIG. 2 is a cross-sectional view schematically illustrating the configuration of the apparatus for manufacturing a continuous reactor type core-shell catalyst electrode according to one exemplary embodiment of the present disclosure when viewed from the rear side.

FIG. 3 is a top plan view schematically illustrating the configuration of the apparatus for manufacturing a continuous reactor type core-shell catalyst electrode according to one exemplary embodiment of the present disclosure.

FIG. 4 is a cross-sectional view illustrating a method of immersing a palladium sheet according to one exemplary embodiment of the present disclosure.

FIG. 5 is a cross-sectional view schematically illustrating a configuration of an apparatus for manufacturing a continuous reactor type core-shell catalyst electrode according to another exemplary embodiment of the present disclosure.

FIG. 6 is a flowchart of a method of manufacturing a continuous reactor type core-shell catalyst electrode according to one exemplary embodiment and another exemplary embodiment of the present disclosure.

DETAILED DESCRIPTION OF THE PREFERRED EMBODIMENT

Hereinafter, exemplary embodiments according to the present disclosure will be described in detail with reference to the accompanying drawings. The detailed description, which will be disclosed below with reference to the accompanying drawings, is made for the purpose of describing the exemplary embodiments of the present disclosure and is not intended to limit only one exemplary embodiment practiced according to the present disclosure. The following detailed description includes specific details for the purpose of providing a thorough understanding of the present disclosure. However, it will be apparent to those skilled in the art that the present disclosure may be practiced without these specific details. In addition, throughout the specification, unless explicitly described to the contrary, the word "comprise/include" and variations such as "comprises/includes" or "comprising/including" will be understood to imply the inclusion of stated elements but not the exclusion of any other elements. In addition, in the description of the exemplary embodiments of the present disclosure, the specific descriptions of publicly known functions or configurations will be omitted when it is determined that the specific descriptions may unnecessarily obscure the subject matter of the present disclosure. In addition, the terms used in the exemplary embodiments of the present disclosure are defined considering the functions in the present disclosure and may vary depending on the intention or usual practice of a user or an operator. Therefore, the definition of the terms should be made based on the entire contents of the technology of the present disclosure.

Hereinafter, as technical means and methods for achieving the object, an apparatus and a method for manufacturing a core-shell catalyst electrode according to one exemplary embodiment of the present disclosure, which coat a palladium sheet by using reaction chambers disposed in a circular shape, will be described in detail, and an apparatus and a method for manufacturing a core-shell catalyst electrode according to another exemplary embodiment of the present disclosure, which coat a palladium sheet by using reaction chambers disposed in a row, will be described in detail.

Apparatus for Manufacturing Continuous Reactor Type Core-Shell Catalyst Electrode According to One Exemplary Embodiment FIG. 1 is a cross-sectional view schematically illustrating a configuration of an apparatus for manufacturing a continuous reactor type core-shell catalyst electrode according to one exemplary embodiment of the present disclosure when viewed from the front side. FIG. 2 is a cross-sectional view schematically illustrating the configuration of the apparatus for manufacturing a continuous reactor type core-shell catalyst electrode according to one exemplary embodiment of the present disclosure when viewed from the rear side. FIG. 3 is a top plan view schematically illustrating the configuration of the apparatus for manufacturing a continuous reactor type core-shell catalyst electrode according to one exemplary embodiment of the present disclosure. FIG. 4 is a cross-sectional view illustrating a method of immersing a palladium sheet according to one exemplary embodiment of the present disclosure.

An apparatus 1 for manufacturing a continuous reactor type core-shell catalyst electrode according to one exemplary embodiment of the present disclosure will be specifically described with reference to FIGS. 1 to 4. The apparatus 1 for manufacturing a continuous reactor type core-shell catalyst electrode includes: a main body 10 which is provided with a support 12 inside thereof and an upper portion of which is opened and closed by being detached from or attached to the support 12; reaction chambers 100 which are disposed plurally in a circular shape inside the main body 10, store reaction solution 30 inside thereof, are equipped with a movable member 80 and counter electrodes 52, and a lateral portion of which is coupled with a reference electrode 51; a power transmission member (not illustrated) which transmits power to the movable member 80; a palladium sheet 20 which is moved by the movable member 80 and immersed in the reaction solution 30 as the movable member 80 moves downward; a power supply 60 which applies a voltage 60 to the electrodes 51 and 52; and a solution injection member 70 which injects a copper precursor-containing solution 71 or a platinum precursor-containing solution 72 into the reaction solution 30.

As illustrated in FIG. 1, the apparatus 1 for manufacturing a continuous reactor type core-shell catalyst electrode according to one exemplary embodiment of the present disclosure may be understood as the apparatus 1 for manufacturing a core-shell catalyst electrode which is disposed in a circular shape.

The main body 10 includes the upper portion 11 and the support 12, allowing opening and closing an inner space where the reaction chambers 100 are accommodated.

The upper portion 11 is a member which is positioned at an upper side of the main body 10 and opens and closes the upper side of the main body 10, and is provided with a protruding member 11a extending downwardly from a lower side of the upper member 11 that is detached from or attached to the support 12.

The support 12 is a member which opens and closes the upper side of the main body 10 through the upper portion 11, and is provided with an insertion groove 12a having a diameter that enables the protruding member 11a provided for the upper portion 11 to be inserted into the insertion groove 12a.

The palladium sheet 20 refers to a metal sheet made of palladium which is a type of metal used for a core.

In one exemplary embodiment, the palladium sheet 20 is described as being made of palladium which is a type of metal used for a core, but appropriate metal may be selected depending on a type of catalyst. For example, such metal is one or more types of metal selected from a group consisting of rhodium, iridium, ruthenium, gold, iron, cobalt, nickel, manganese, chromium, vanadium, titanium, niobium, molybdenum, and tungsten.

That is, the palladium sheet 20 may be understood as a metal sheet which is not a sheet merely including palladium but a sheet that may be selected and used depending on a type of catalyst.

The reaction solution 30 is stored in the first, second, third reaction chambers 110, 120, and 130, respectively. However, the reaction solution 30 of the first reaction chamber 110 is a solution for reducing the palladium sheet 20 and coating the palladium sheet 20 with the copper. The reaction solution 30 of the second reaction chamber 120 is a solution for coating the copper-coated palladium sheet 20 with platinum. The reaction solution 30 of the third reaction chamber 130 is a solution (e.g., water) for cleaning the palladium sheet 20 coated with platinum.

That is, the reaction solutions 30 stored in the first, second, and third reaction chambers 110, 120, and 130 may be understood as being different solutions.

As described above, electrodes 50 include the reference electrode 51 and the counter electrode 52. Although not illustrated in the drawings, the electrode 50 may further include a working electrode. Hereinafter, since configurations of the reference electrode 51 and the counter electrode 52 may be sufficiently understood by those skilled in the art, a detailed description thereof will be omitted.

The power supply 60 is connected to the reference electrode 51 and the counter electrode 52 and applies a voltage to the electrodes 51 and 52 in an appropriate cycle.

The solution injection member 70 stores therein the copper precursor-containing solution 71 for coating the palladium sheet 20 with copper or the platinum precursor-containing solution 72 for coating the palladium sheet 20 with platinum. As an example, the copper precursor-containing solution 71 of 10 mM to 1 M may be stored in the solution injection member 70 or the platinum precursor-containing solution 72 of 50 mM may be stored in the solution injection member 70.

The first reaction chamber 110 is with the reference electrode 51 and the counter electrode 52, reduces the palladium sheet 20 as the voltages of the electrodes 51 and 52 are applied to the reaction solution 30 which the palladium sheet 20 is immersed in, and coats the reduced palladium sheet 20 with copper by the solution injection member 70.

The first reaction chamber 110 accommodates therein a porous block 40. Specifically, the porous block 40 is accommodated in the first reaction chamber 110 and positioned at an upper side of the reference electrode 51.

As described above, the porous block 40 is accommodated in the first reaction chamber 110 so as to solve a problem that because of the structure of the palladium sheet 20, it is difficult to completely immerse the palladium sheet 20 in the reaction solution 30 when the palladium sheet 20 is immersed in the reaction solution 30 of the first reaction chamber 110 as the movable member 80 moves downwardly.

The porous block 40 has conductivity as well as elasticity. Therefore, when the palladium sheet 20 is moved downwardly by the movable member 80, the palladium sheet 20 is contacted with the porous block 40, allowing completely immersed in the reaction solution 30. The palladium sheet 20 may be easily reduced and coated with copper in the first reaction chamber 110 therethrough.

The second reaction chamber 120 is injected with platinum precursor-containing solution 72 from the solution injection member 70. Further, the second reaction chamber 120 coats the copper-coated palladium sheet 20 with platinum by the injected platinum precursor-containing solution 72.

In the second reaction chamber 120, a platinum precursor of the platinum precursor-containing solution 72 and the copper, which coats the palladium sheet 20, are transposed by galvanic transposition. Therefore, the copper-coated palladium sheet 20 is coated with platinum.

The third reaction chamber 130 stores water therein, allowing cleaning the platinum-coated palladium sheet 20.

The third reaction chamber 130 is supplied with water from the outside and provided with a circulation line for circulating the water inside thereof, allowing cleaning the platinum-coated palladium sheet 20.

Meanwhile, a device for generating bubbles may be additionally provided for the first, second, and third reaction chambers 110, 120, and 130 on each lower side thereof respectively. Therefore, it is possible to enable the first reaction chamber 110 to smoothly perform the reduction and copper coating processes, the second reaction chamber 120 to smoothly perform the platinum coating process, and the third reaction chamber 130 to smoothly perform the cleaning process.

The movable member 80 moves the palladium sheet 20 to the reaction chambers 100. Referring to FIG. 4, for example, the movable member 80 moves the palladium sheet 20 to the first, second, and third reaction chambers 110, 120, and 130 while moving along a moving path 80a. Herein, the palladium sheet 20 may move in the order of the first, second, and third reaction chambers 110, 120, and 130.

Further, the movable member 80 moves downwardly, allowing immersing the palladium sheet 20 in the reaction solution 30. The movable member 80 is provided with a fixing unit 81 on a lower side thereof and moves downwardly in a state of fixing the palladium sheet 20, allowing immersing the palladium sheet 20 in the reaction solution 30.

Meanwhile, the movable member 80 is operated by receiving power through a power transmission member (not illustrated).

Apparatus for Manufacturing Continuous Reactor Type Core-Shell Catalyst Electrode According to Another Exemplary Embodiment FIG. 5 is a cross-sectional view schematically illustrating a configuration of an apparatus for manufacturing a continuous reactor type core-shell catalyst electrode according to another exemplary embodiment of the present disclosure.

An apparatus 2 for manufacturing a continuous reactor type core-shell catalyst electrode according to another exemplary embodiment of the present disclosure will be specifically described with reference to FIG. 5. The apparatus for manufacturing a continuous reactor type core-shell catalyst electrode includes: a main body 10 an upper portion of which is opened and closed by attachment/detachment; reaction chambers 100 which are disposed plurally in a line inside thereof, store reaction solution 30 inside thereof, are equipped with counter electrodes 52, and a lateral portion of which is coupled with a reference electrode 51; a palladium sheet 20 which is immersed in the reaction solution; a movable member 200 which accommodates the palladium sheet and moves the accommodated palladium sheet to be immersed in the reaction solution 30; a moving path member 300 which provides the movable member 200 with a moving path; a power transmission member which transmits power to the movable member; a power supply 60 which applies a voltage to the electrodes 51 and 52; and a solution injection member 70 which injects a copper precursor-containing solution or a platinum precursor-containing solution 72 into the reaction solution 30.

As illustrated in FIG. 5, the apparatus 2 for manufacturing a continuous reactor type core-shell catalyst electrode according to another exemplary embodiment of the present disclosure may be understood as the apparatus for manufacturing a core-shell catalyst electrode which is disposed in a line.

Hereinafter, descriptions of configurations identical to the configurations of the apparatus 1 for manufacturing a continuous reactor type core-shell catalyst electrode according to one exemplary embodiment of the present disclosure will be omitted. Only the configurations different from the configurations of the apparatus 1 for manufacturing a continuous reactor type core-shell catalyst electrode according to one exemplary embodiment of the present disclosure will be described.

The palladium sheet 20 refers to a metal sheet made of palladium which is a type of metal used for a core, and is, as illustrated in FIG. 5, installed to the movable member 200.

The palladium sheet 20 is installed to an upper side of the movable member 200. The movable member 200 moves the palladium sheet 20 along the moving path of the moving path member 300. A fitting groove (not illustrated) which is fitted with a lower part of the palladium sheet 20 may be formed in the upper side of the movable member 200, so as to safely installing the palladium sheet 20.

Further, it will be understood that the movable member 200 is moved by receiving power through a power transmission member (not illustrated in the drawings).

The moving path member provides the movable member 200 with a moving path. Particularly, the moving path member 300 provides the moving path, allowing immersing the palladium sheet 20 in the respective reaction solutions 30 of the first, second, and third reaction chambers 110, 120, and 130.

The moving path provided by the moving path member 300 will be specifically described with reference to FIG. 5. The moving path may include a first path in which the movable member 200 moves into the first reaction chamber 110 from the inner space of the main body 10, allowing immersing the palladium sheet 20 in the reaction solution 30 of the first reaction chamber 110, a second path in which the movable member 200, which has passed through the first reaction chamber 110, moves into the second reaction chamber 120 from the inner space of the main body 10, allowing immersing the copper-coated palladium sheet 20 in the reaction solution 30 of the second reaction chamber 120, and a third path in which the movable member 200, which has passed through the second reaction chamber 120, moves into the third reaction chamber 130 from the inner space of the main body 10, allowing the platinum-coated palladium sheet 20 in the reaction solution of the third reaction chamber 130.

Meanwhile, in the apparatus 2 for manufacturing a continuous reactor type core-shell catalyst electrode according to another exemplary embodiment of the present disclosure, the palladium sheet 20 is illustrated as being installed to the upper side of the movable member 200, but this configuration may be changed in design such that the palladium sheet 20 is installed to the lower side of the movable member 200 like the first exemplary embodiment.

Further, although not illustrated in the drawings, porous blocks 40 may be accommodated inside the first reaction chamber 110 and the second reaction chamber 120, respectively.

Accordingly, it is preferable that the movable member 200 moves so that the palladium sheet 200 is contacted with the porous blocks 40.

The palladium sheet 20 is contacted with the porous blocks 40 in the first reaction chamber 110 and the second reaction chamber 120 by the movable member 200, allowing easily reducing the palladium sheet 20 and coating with copper.

Method of Manufacturing Continuous Reactor Type Core-Shell Catalyst Electrode According to One Exemplary Embodiment FIG. 6 is a flowchart of a method of manufacturing a continuous reactor type core-shell catalyst electrode according to one exemplary embodiment and another exemplary embodiment of the present disclosure.

Hereinafter, a method of manufacturing a core-shell catalyst electrode by using the reaction chambers disposed in a circular shape will be specifically described for each step.

First, the palladium sheet 20 is moved into the first reaction chamber 110 by the movable member 80 and immersed in the reaction solution 30 of the first reaction chamber 110.

Herein, the type of solvent used for the reaction solution 30 of the first reaction chamber 110 may be appropriately adjusted depending on factors such as the type, density, a boiling point, surface tension, a dielectric constant of the palladium sheet 20. The solvent is generally acidic, but the acidity of the solvent may be appropriately adjusted depending on the environment and purpose. For example, the palladium sheet 20 may contain one or more solvents selected from water, sulfuric acid, and various types of hydrocarbon-based compounds such as ethanol, acetone, ethylene glycol, and polymers.

Thereafter, the voltage is applied to the electrodes 51 and 52 provided in the first reaction chamber 110, allowing reducing the palladium sheet 20 (S10).

Herein, the power supply 60 applies the voltage to the electrodes 51 and 52 in an appropriate cycle so as to sufficiently reduce the palladium sheet 20. Specifically, for example, two or more cycles are performed in a region having low electric potential (about 0.46 V vs. SHE), that is, open circuit electric potential (OCV), and then the voltage may be maintained at about 0.46 V until an electric current value for reducing the palladium is rarely changed.

Meanwhile, in the method according to one exemplary embodiment, the palladium sheet 20 may come into a Pd/C state by a reaction solution which is mixed with a carbon substance that serves as a support body from a separate reaction chamber (not illustrated) during the process of applying the voltage to the electrodes 51 and 52 or before the palladium sheet 20 is moved into the first reaction chamber 110.

After S10, the solution injection member 70 injects the copper precursor-containing solution 71 into the reaction solution 30 of the first reaction chamber 110. For example, a copper precursor of 10 nM to 1 M may be contained in the copper precursor-containing solution 71 stored in the solution injection member 70.

Further, the power supply 60 applies electric potential, which is higher than oxidation and reduction of copper, to the electrodes 51 and 52 provided for the first reaction chamber 110, allowing coating the reduced palladium sheet 20, which is immersed in the reaction solution 30, with copper (S20).

Herein, the electric potential, which is higher than oxidation of copper, may mean electric potential within a range of 0.34 V to 0.46 V (vs. SHE). If the electric potential is lower than 0.24 V, electroplating occurs at an excessive level. And if the electric potential is higher than 0.46 V, copper atoms are not reduced on a surface of the palladium sheet 20 but maintained in the form of ions in the solution, not allowing manufacturing a particle having a core-shell shape. Therefore, the electric potential within the above-mentioned range is applied thereto.

Further, the palladium sheet 20, to which the electric potential within the aforementioned range is applied, may be coated with copper at a level of a monoatomic layer or a double atomic layer.

Furthermore, in S20 of coating the reduced palladium sheet 20 with copper, a stirring process and the process of applying electric potential higher than power for oxidizing copper may be performed at the same time.

After S20, the copper-coated palladium sheet 20 is moved into the second reaction chamber 120 by the movable member 80 and immersed in the reaction solution 30 of the second reaction chamber 120.

Thereafter, the solution injection member 70 installed in the second reaction chamber 120 injects the platinum precursor-containing solution 72 into the reaction solution 30. As an example, a platinum precursor of 50 M may be contained in the solution injection member 70 for substitution of a platinum ion.

In this case, galvanic transposition occurs on the copper-coated palladium sheet 20 by the platinum precursor-containing solution 72, thereby coating the surface of the palladium sheet 20 with platinum (S30).

After S30, the platinum-coated palladium sheet 20 is moved into the third reaction chamber 130 by the movable member 80, and then the palladium sheet 20 is immersed in the reaction solution 30 of the third reaction chamber 130, allowing cleaning (S40).

Herein, as described above, the reaction solution 30 of the third reaction chamber 130 may be a solution (e.g., water) for cleaning the platinum-coated palladium sheet.

Further, the circulation line for circulating the reaction solution 30 is provided for the third reaction chamber 130, allowing easily cleaning the platinum-coated palladium sheet 20.

Method of Manufacturing Continuous Reactor Type Core-Shell Catalyst Electrode According to Another Exemplary Embodiment The method of manufacturing a core-shell catalyst electrode using a disposition type according to another exemplary embodiment is a method of manufacturing a core-shell catalyst electrode by using the reaction chambers disposed in series unlike one exemplary embodiment. Processes, which are equal to the palladium sheet reducing step (S10), the copper coating step S20, the platinum coating step (S30), and the cleaning step (S40) according to one exemplary embodiment, are also performed by the manufacturing method according to another exemplary embodiment except that the palladium sheet 20 is moved by the movable member 200 and the movement route member 300 instead of the movable member 80 according to one exemplary embodiment. Accordingly, the detailed description of the manufacturing method according to another exemplary embodiment will be omitted.

It will be appreciated that the exemplary embodiments of the present disclosure have been described above for purposes of illustration, and those skilled in the art may understand that the present disclosure may be easily modified in other specific forms without changing the technical spirit or the essential features of the present disclosure. Therefore, it should be understood that the above-described exemplary embodiments are illustrative in all aspects and do not limit the present disclosure. For example, each component described as a single type may be carried out in a distributed manner. Likewise, components described as a distributed type can be carried out in a combined type.

The scope of the present disclosure is represented by the claims to be described below rather than the detailed description, and it should be interpreted that the meaning and scope of the claims and all the changes or modified forms derived from the equivalent concepts thereto fall within the scope of the present disclosure.

DESCRIPTION OF REFERENCE NUMERALS

10: Main body
11: Upper portion of main body
11a: Protruding member
12: Support
12a: Insertion groove
13: First groove
14: Second groove
20: Palladium sheet
30: Reaction solution
40: Porous block
51: Reference electrode
52: Counter electrode
60: Power supply
70: Solution injection member
71: Copper precursor-containing solution 72: Platinum precursor-containing solution
80, 200: Movable member
81: Fixing unit
90: Power transmission member
100: Reaction chamber
110: First reaction chamber
120: Second reaction chamber
130: Third reaction chamber
300: Moving path member

What is claimed is:

1. An apparatus for manufacturing a continuous reactor type core-shell catalyst electrode comprising:
   a main body which is provided with a support inside thereof and an upper portion of which is opened and closed by being detached from or attached to the support;
   reaction chambers which are disposed plurally in a circular shape inside the main body, store reaction solution inside thereof, are equipped with a movable member and a counter electrode, and are coupled with a reference electrode to a lateral portion thereof;
   a power transmission member which transmits power to the movable member;
   a palladium sheet which is moved by the movable member and immersed in the reaction solution as the movable member moves downward;
   a power supply which applies a voltage to the electrodes; and
   a solution injection member which injects a copper precursor-containing solution or a platinum precursor-containing solution into the reaction solution.

2. The apparatus of claim 1, wherein the reaction chambers comprise:
   a first reaction chamber in which the counter electrode is installed inside thereof, the reference electrode is coupled to the lateral portion thereof, and the palladium sheet, which is moved by the movable member and immersed in the reaction solution, is coated with copper via an underpotential deposition (UPD) by applying a potential to the counter electrode and the reference electrode with the power supply, wherein the potential is higher than a redox potential of copper; and
   a second reaction chamber in which a copper-coated palladium sheet, which is moved from the first reaction chamber by the movable member and then immersed in the reaction solution, is coated with platinum.

3. The apparatus of claim 2, wherein the first reaction chamber is characterized by accommodating a porous block which is composed of a metal mesh to be contacted with the palladium sheet which is moved downwardly by the movable member.

4. The apparatus of claim 2, wherein the second reaction chamber is characterized in that the copper-coated palladium sheet is immersed in the reaction solution and the platinum precursor-containing solution is injected into the reaction solution from the solution injection member, thus coating the copper-coated palladium sheet with platinum.

* * * * *